United States Patent [19]
Tolf

[11] Patent Number: 5,107,706
[45] Date of Patent: Apr. 28, 1992

[54] LEVEL SENSOR DEVICE FOR HOUSEHOLD APPLIANCES

[75] Inventor: Anders K. H. Tolf, Jönköping, Sweden

[73] Assignee: Aktiebolaget Electrolux, Stockholm, Sweden

[21] Appl. No.: 513,102

[22] Filed: Apr. 19, 1990

[30] Foreign Application Priority Data

May 2, 1989 [SE] Sweden .................... 8901580

[51] Int. Cl.⁵ .................. D06F 35/00; G01F 23/14
[52] U.S. Cl. ........................... 73/302; 134/113; 137/387
[58] Field of Search ............ 73/299, 302; 134/113; 137/387

[56] References Cited

U.S. PATENT DOCUMENTS

| | | | |
|---|---|---|---|
| 3,344,804 | 10/1967 | Lyman | 73/299 X |
| 3,918,457 | 11/1975 | Racenis | 137/387 |
| 4,066,094 | 1/1978 | Stitch | 137/387 |
| 4,697,293 | 10/1987 | Knoop | 137/387 |
| 4,893,498 | 1/1990 | Jensen | 73/299 |

FOREIGN PATENT DOCUMENTS

| | | |
|---|---|---|
| 2457206 | 6/1977 | Fed. Rep. of Germany . |
| 2439982 | 5/1980 | France . |
| 1081082 | 8/1967 | United Kingdom . |

*Primary Examiner*—Daniel M. Yasich
*Attorney, Agent, or Firm*—Pearne, Gordon, McCoy & Granger

[57] ABSTRACT

A level sensing device for household appliances or the like. The device comprises a compartment (25) which at its lower part via a single combined inlet and outlet (42) is connected to a treatment chamber into which liquid is supplied. The upper part of the compartment (25) is divided into two sections (26, 27), one section (26) communicating with a pressure sensing means and the other section (27) communicating with atmosphere. By this arrangement a rapid and complete emptying of the sensor is ensured when the treatment chamber is emptied.

5 Claims, 2 Drawing Sheets

LEVEL SENSOR DEVICE FOR HOUSEHOLD APPLIANCES

BACKGROUND OF THE INVENTION

This invention relates to a level sensing device for household appliances or the like and comprises a member having a compartment which, at its lower part, via a combined inlet and outlet is connected to a treatment chamber to which liquid is supplied. The upper part of the compartment forms a closed section that is in communication with a pressure sensing means.

It is known in the art to use level sensing devices for household appliances such as dish-washers and washing machines since it is necessary to cut off the supply of water to the machine when the water has reached a predetermined level in the treatment chamber. A common method of sensing the level of water in the treatment chamber is to create a means of communication between the treatment chamber and the lower part of an hermetically sealed compartment by means of a hose while connecting the upper part of the sealed compartment with a pressure sensor. Because of the increase in air pressure in the compartment when water flows into it, the water level in the compartment does not rise as much as the water level in the treatment chamber. When emptying the machine by discharging the water in the treatment chamber, the water which has been collected in the compartment flows into the treatment chamber due to gravity and the pressure built up in the compartment. However, the flow of water from the sealed compartment into the treatment chamber takes a rather long time since air has to flow in the opposite direction of the discharging water. Also, there is a risk that the compartment will not be completely emptied of water due to air leakage, causing the system to work improperly.

GB 1.081.082 shows another type of level sensor for a washing machine wherein the level sensor comprises a container having several sections separated by partition walls. One of the sections is connected to a pressure sensor. A second section is in communication with the other sections by means of a communicating channel and is also connected to a pump by means of a hose. The remaining sections communicate with atmosphere. There also is an overflow device and combined inlet and outlet for water. The purpose of this arrangement is to prevent foam from rising up into the pressure sensing section. However, this device is complicated because of the large number of sections and the separate pump connection required to empty the device.

SUMMARY OF THE INVENTION

The purpose of the present invention is to create a simple level sensor and to eliminate the above problems by ensuring a complete emptying of the compartment in a very short time. This is accomplished by the level sensor comprising a container with a compartment which is connected, at its lower part, to the treatment chamber by a combined inlet and outlet and, at its upper part, having one section in communication with a pressure sensing device while another, separate section is in communication with atmosphere.

BRIEF DESCRIPTION OF THE DRAWINGS

The invention will now be described with reference to the accompanying drawings where FIG. 1 diagrammatically shows a partly broken side view of a dish-washer in which the invention is used.

DETAILED DESCRIPTION OF THE PREFERRED EMBODIMENT

Figure 1:
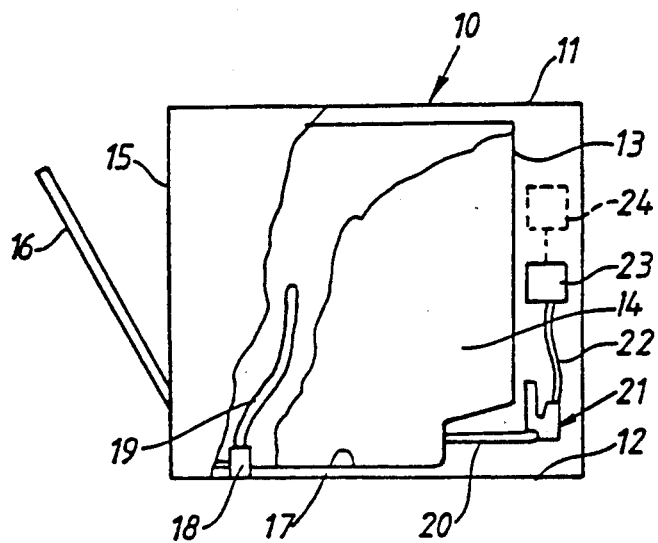
Figure 2:
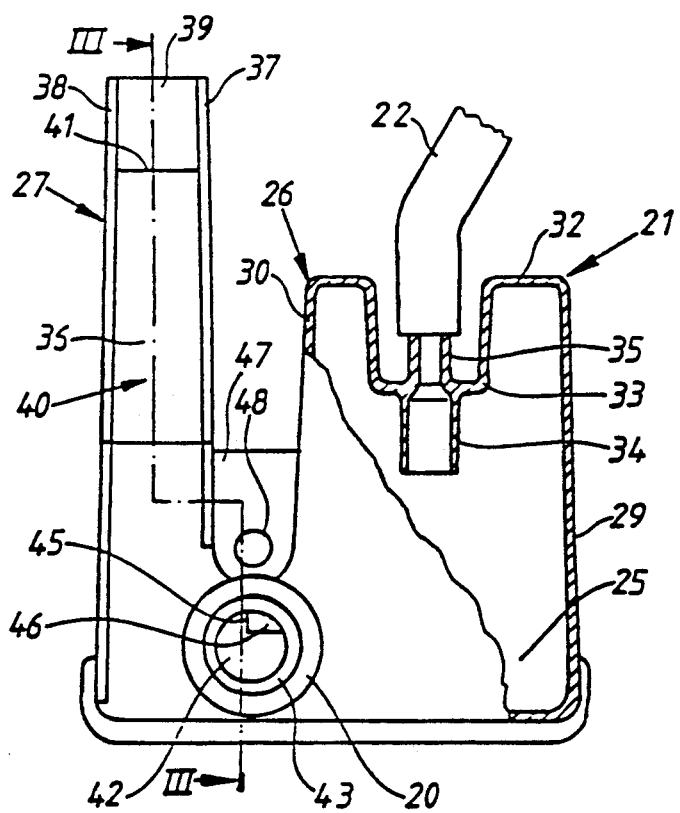
FIG. 2 shows a partly broken front view of the device according to the invention.
Figure 3:
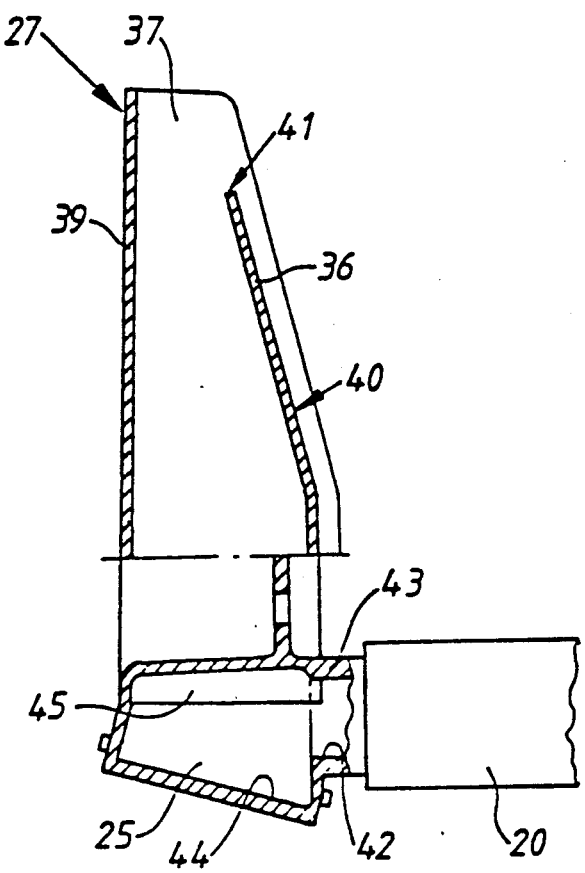
FIG. 3 shows a section on the line III—III in FIG. 2
Figure 4:
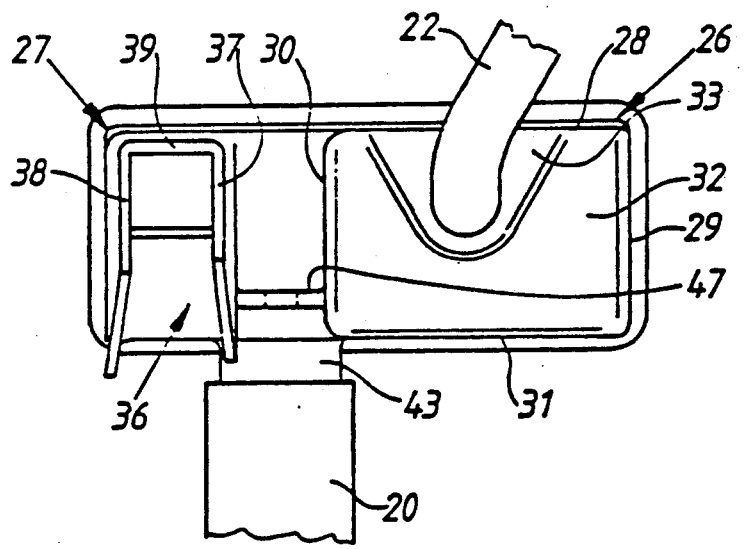
FIG. 4 shows a plan view of said device.

As appears from FIG. 1 the dish-washer 10 comprises an outer shell 11 with a bottom plate 12 which encloses an inner shell 13 surrounding a treatment chamber 14 in which the dish is inserted and washed. The treatment chamber 14 has an opening 15 which, during the dish-washing operation, is covered by a lid 16. The lower part of the treatment chamber is provided with a sump 17 to which the water supplied to the dish-washer is guided and from which it is pumped to spray arms, not shown, in the treatment chamber. The spray arms distribute the water onto the dish. From the sump, the water can be discharged via a sewage pump, not shown, to a sewage or the like. In order to prevent overflow, the machine is usually provided with an overflow valve 18 cutting off the water supply to the machine through the hose 19 if water should flow down on the bottom plate 12.

In order to cut off the water supply when a suitable quantity of water is present in the machine, the sump 17 is connected to a level container 21 via a hose 20. The container 21 is placed between the outer shell 11 and the inner shell 13 of the machine and is connected to a pressure sensor 23 via a hose 22. The pressure sensor 23 is also connected to the electric circuit 24 of the machine responsive to a certain predetermined pressure such that when this predetermined pressure level is detected by the pressure sensor 23 a valve, now shown, cuts off the water supply through the hose 19.

The level container 21, which preferably is made of plastic, comprises a compartment 25 having a first and second separate upper sections, 26 and 27 respectively. The first section 26 is defined by sidewalls 28, 29, 30, 31 and a roof part 32 connecting the sidewalls. The roof part 32 has a lower central area 33 surrounding a sleeve 34 which extends down into the first compartment. The sleeve continues vertically upwards as a tube-shaped socket 35 to which the hose 22 connecting the pressure sensor 24 is fastened.

The second section 27 is shaped as an upwardly open channel with four sidewalls 36, 37, 38 and 39. One sidewall 36 is somewhat shorter than the other sidewalls and inclined such that the channel which is formed by the sidewalls is narrowed in the upwards direction. The sidewalls 37 and 38 are extended somewhat outside the shorter, inclined sidewall 36, forming a trench 40. This trench 40 allows water, which might rise to a level above the upper edge 41 of the inclined sidewall 36, to flow to the bottom plate 12 of the machine.

The lower part of the compartment 25 has a combined inlet and outlet 42 which is shaped as a sleeve 43 to which the hose 20 communicating with the treatment chamber 14 is connected. The combined inlet and outlet 42 is placed between the two sections 26, 27 at the bottom 44 of the compartment to provide communication between the respective sections and the treatment chamber 14. A short partition wall 45 extends vertically downwards between the two sections 26, 27 in the area of the combined inlet and outlet 42. This partition wall 45 extends into a part 46 which is a continuation of the sidewall 31. Thus, the part 46 restricts a part 45 of the combined inlet and outlet 42 and the two parts 45, 46 cooperate to separate the first 26 and second 27 sections from each other.

Between the two sections there also is a flange 47 with a hole 48 by means of which the level container 21 can be fastened at a suitable height in the lower part of the machine. Of course, this height has to be adapted to the actual levels in the treatment chamber 14.

The device operates in the following manner. The water entering the treatment chamber 14 through the hose 19 flows down into the sump 17. When the water level in the sump reaches the hose 20, water will flow through the hose 20 and the combined inlet and outlet 42 and into the level container 21. A continued rise of the level in the sump 17 and in the treatment chamber 14, according to the low of communicating vessels, means that the water surface, after a certain time, reaches the lower part of the partition wall 45 while air leaves through the section 27. When additional water enters the machine and hence the container 21, the water level in the second section 27 will rise at the same rate as the level in the treatment chamber. Air continues to leave the atmosphere through the opening in the upper part of the second section 27. In the first section 26 however, the level will not rise as much as in the second section 27 since air above the water surface in the first section 26 will be compressed, creating an increased pressure in the hose 22. This increased pressure influences the pressure sensor 23 which will be activated at a certain value corresponding to a certain level in the treatment chamber. The pressure sensor will activate the electric circuit 24 so that the flow of water into the machine through the water inlet hose 19 is cut off.

When emptying starts following a dish-washing operation and the water is discharged from the treatment chamber to the sewage, the water will flow to the sump 17 through the combined inlet and outlet 42. At the same time, air will be drawn into the level container 21 through the second section 27 so that the level in the second section decreases at the same rate as the level in the treatment chamber 14 and the sump 17. Usually the level in the first section 26 also decreases such that the levels in the two sections are the same when the water level reaches the lower part of the partition wall 45. Should air have leaked out of the first section 26 or the hose 22, causing a rising water level in it, then air during the emptying stage will move upwards from the second section 27, below the partition wall 45 and further into the first section 26, thereby speeding up the equalization of the sub-atmospheric pressure which, in such a situation, is present above the water surface in the first section 26. By this arrangement a construction is achieved which is able to deal with large air leakages and which allows a very rapid rate of water discharge from the container.

Should the water level in the treatment chamber 14 become so high that the water flows over the edge 41 of the inclined sidewall 36 this water will be guided by the trench 40 to the bottom plate of the machine, activating the overflow valve 18 so that any further supply of water to the treatment chamber 14 through the inlet hose 19 is prevented.

I claim:

1. In a level sensing device for controlling the level of liquid within a household appliance or the like, comprising a container (21) having a compartment (25) which at its lower part via a single combined inlet and outlet (42) is connected to a treatment chamber (14) to which liquid is supplied, the upper part of the compartment having a first section (26) communicating with a pressure sensing means (23) so that the level of liquid in the treatment chamber may be sensed, and a second section (27) which is in communication with atmosphere, said first (26) and second (27) sections being separated from each other by a partition wall (45), and said container being located adjacent to and above a bottom of the treatment chamber.

2. A device according to claim 1, wherein the container (21) is made of plastic.

3. A device according to claim 1, wherein the partition wall (45) extends mainly vertically downwards in the area between the two sections, the lower edge of the partition wall being placed below the upper part of the combined inlet and outlet (42).

4. A device according to claim 1 or 3, wherein the partition wall (45) is placed so that its imagined continuation divides the combined inlet and outlet (42) in two mainly equally large parts.

5. A device according to claim 4, wherein the partition wall (45) continues into a part (46) which partly covers the combined inlet and outlet (42).

* * * * *